United States Patent [19]

McGarry

[11] Patent Number: 5,914,439
[45] Date of Patent: Jun. 22, 1999

[54] DIFFUSION BARRIER FOR BORES OF GLASS FIBER SPINNERS PROVIDING HIGH CORROSION AND OXIDATIVE RESISTANCE AT HIGH TEMPERATURES

[75] Inventor: Dennis McGarry, Granville, Ohio

[73] Assignee: Owens Corning Fiberglas Technology, Inc., Summit, Ill.

[21] Appl. No.: 08/852,861

[22] Filed: May 8, 1997

[51] Int. Cl.$^6$ ............................................. C03B 37/095
[52] U.S. Cl. ..................... 65/493; 65/374.11; 65/374.12; 65/374.13; 65/457; 65/463; 65/492; 65/493; 65/515; 427/248.1; 427/249; 427/405; 427/419.7; 427/437
[58] Field of Search ............................ 65/374.11, 374.12, 65/374.13, 457, 463, 492, 493, 515; 427/248.1, 249, 405, 419.7, 437

[56] References Cited

U.S. PATENT DOCUMENTS

| | | | |
|---|---|---|---|
| 2,106,527 | 1/1938 | Hostetter | 65/493 |
| 3,248,190 | 4/1966 | Woodward et al. | 65/493 |
| 3,312,537 | 4/1967 | Colgan . | |
| 3,318,694 | 5/1967 | Heitmann . | |
| 3,384,478 | 5/1968 | Firnhaber . | |
| 3,552,952 | 1/1971 | Shaw . | |
| 3,933,484 | 1/1976 | Costin . | |
| 3,980,473 | 9/1976 | Costin | 65/515 |
| 3,984,240 | 10/1976 | Costin . | |
| 4,140,507 | 2/1979 | Costin et al. | 65/374.13 |
| 4,192,667 | 3/1980 | Chrisman | 65/493 |
| 4,203,746 | 5/1980 | Battigelli et al. . | |
| 4,203,747 | 5/1980 | Fezenko . | |
| 4,203,748 | 5/1980 | Battigelli et al. . | |
| 4,430,105 | 2/1984 | Bhatti et al. | 65/493 |
| 4,511,383 | 4/1985 | Bhatti . | |
| 4,518,408 | 5/1985 | Bhatti . | |
| 4,565,559 | 1/1986 | Perkins | 65/493 |
| 4,662,920 | 5/1987 | Coupland et al. . | |
| 4,668,265 | 5/1987 | Gaul et al. . | |
| 4,668,266 | 5/1987 | Gaul . | |
| 4,708,848 | 11/1987 | Lewis . | |
| 4,761,169 | 8/1988 | Gaul . | |
| 4,765,817 | 8/1988 | Gaul . | |
| 4,767,432 | 8/1988 | Gaul . | |
| 4,820,324 | 4/1989 | Gaul et al. . | |
| 4,877,435 | 10/1989 | Haeberle, Jr. et al. . | |
| 4,904,290 | 2/1990 | Gaul et al. . | |
| 5,085,679 | 2/1992 | Hinze et al. . | |
| 5,118,332 | 6/1992 | Hinze . | |
| 5,330,591 | 7/1994 | Vasseur . | |
| 5,385,595 | 1/1995 | McGarry | 65/515 |
| 5,417,735 | 5/1995 | McGarry . | |

FOREIGN PATENT DOCUMENTS

| | | | |
|---|---|---|---|
| 61-136928 | 6/1986 | Japan | 65/374.13 |

*Primary Examiner*—Peter Chin
*Assistant Examiner*—Michael P. Colaianni
*Attorney, Agent, or Firm*—Curtis B. Brueske; Stephen W. Barns

[57] ABSTRACT

A durable, corrosion-resistant glass fiber spinner is prepared by applying as a barrier layer a uniform layer of an alloy, compatible with the material of the spinner, on the walls of the spinner bores. A layer of platinum group metal is applied over the barrier layer.

8 Claims, No Drawings

DIFFUSION BARRIER FOR BORES OF GLASS FIBER SPINNERS PROVIDING HIGH CORROSION AND OXIDATIVE RESISTANCE AT HIGH TEMPERATURES

TECHNICAL FIELD AND INDUSTRIAL APPLICABILITY OF THE INVENTION

This invention relates generally to the use of a diffusion barrier for glass fiber spinner bores coated with platinum group metals. More particularly, the invention is directed to a method for applying or forming a uniform layer of a material to the cylindrical surfaces of glass fiber spinner bores to act as a diffusion barrier, and applying thereover a uniform layer of platinum or other platinum group metal or alloy.

BACKGROUND OF THE INVENTION

In certain industrial applications, such as the production of glass fiber wool for preparing thermal or acoustical insulation products, there is a need for metal alloys which possess certain characteristics such as high rupture strength, high corrosion resistance, and high oxidation resistance at elevated temperatures. Specifically, in the glass fiber and mineral fibers industries, filaments which may be used for preparing such insulation products are produced by passing molten glass or mineral through the bores of the foraminous wall of a chamber which is adapted for rotation at high angular velocities (said chamber being known as a spinner). The filaments are extruded through the fiberizing bores due to the centrifugal action of the rotating spinner. Such spinners are typically operated at a temperature of about 1121° Centigrade and an angular velocity of about 2300 rpm. It is advantageous, from a glass fiber production cost standpoint, for the angular velocity to be as high as possible so as to maximize the rate at which filaments are extruded through the fiberizing bores. However, high spinner angular velocities result in reduced spinner life, as the bores of glass fiber spinners have been found to be especially susceptible to corrosion caused by molten glass. This is primarily due to the limited corrosion resistance of typical spinner base metal alloys. The flow of molten glass or mineral through the spinner bores corrodes the cylindrical walls of the bores causing them to enlarge, resulting in a loss of control over fiber diameter.

It is well-known in the glass fiber manufacturing art to apply one or more layers of platinum or other platinum group metal or alloy over the surfaces of the spinner base metal components which contact the molten glass, to reduce corrosion of the base metal alloy by the glass. For example, U.S. Pat. No. 4,404,009 to Bhatti et al. discloses a glass fiber spinner having platinum group metal tubular inserts that are press-fit into the spinner bores. Further, in 1987, a method was disclosed for applying a platinum coating to the surfaces of glass fiber spinner bores. Johnson, D. C. "Platinum Coating Technique Developed For The Glass Industry," *Glass*, September: page 372, 1987. With this method, a thin layer of platinum is bonded directly to the spinner base metal alloy. Unfortunately, however, when platinum is bonded directly to the base metal alloy of, for example, a glass fiber spinner, an undesirable diffusion zone forms near the interface between the platinum group metal layer and base metal alloy. The base metal alloy atoms diffuse through the platinum layer, are oxidized at the glass-metal interface, and are carried away by the glass, leaving a porous base metal alloy structure immediately surrounding the annularly-shaped platinum metal layer. Eventually, the bond between the base metal alloy and platinum layer fails, causing the platinum layer to sluff away from the cylindrical surface of the spinner bore. This failure does not occur all at once, but occurs over a period of time with degradation in quality of the fibers produced. The final result is virtually no increase in spinner life and the loss of expensive precious metal.

SUMMARY OF THE INVENTION

Accordant with the present invention, there has been discovered a process for applying durable, corrosion-resistant metallic coatings to the bores of spinners used in the manufacture of glass fibers. In this process, a substantially uniform barrier layer of an alloy or element compatible with the spinner base material is first applied to the surfaces of the spinner bores or alloyed with the base metal. Thereafter, a substantially uniform layer of a platinum group metal is applied to the barrier layer of the compatible alloy. Inclusion of the barrier layer between the spinner base material and the platinum group metal coating has been found to increase the longevity of the bond therebetween and greatly reduce the diffusion of base metal through the precious metal layer.

The invention further includes corrosion-resistant glass fiber spinners having a substantially uniform barrier layer of an alloy compatible with the spinner base material adhered to the surfaces of the bores and a substantially uniform layer of a platinum group metal adhered to the barrier layer.

DETAILED DESCRIPTION AND PREFERRED EMBODIMENTS OF THE INVENTION

The invention is directed to a process for making a durable, corrosion-resistant glass fiber spinner, and to a spinner made thereby. The inventive spinner may be used to extrude glass or other molten mineral to produce fibers. By the term "glass fiber" as it is used herein is meant vitreous fibers of glass, slag, or other mineral material. The inventive spinner is durable, meaning that its bores resist corrosion due to contact with molten glass or other mineral material.

Glass fiber spinners are well-known in the art and comprise a generally cylindrical chamber which may be rotated at a high angular velocity. The periphery of the chamber is defined by a foraminous wall having a plurality (generally, from about a few hundred to about several thousand) of bores passing radially therethrough. The bores typically are less than one millimeter in diameter. Molten glass or other mineral material directed into the chamber is extruded through the bores in the foraminous wall upon rotation of the spinner. The bores are generally produced by laser drilling through the cylindrical wall of the chamber. The bores could likewise be formed by other conventional techniques such as, for example, mechanical drilling, twist drilling, electro-discharge machining or electron beam drilling. Thus, the bores are substantially cylindrical in configuration. The spinners are generally made of a high rupture strength alloy containing chromium, nickel, and cobalt, as well as several other elements and/or refractory metals in small quantities. Typical spinners and spinner alloys are more fully set forth in U.S. Pat. Nos. 3,933,484, 4,820,324 and 4,877,435 which are incorporated herein in their entirety by reference thereto. Often the base metals or alloys of the spinners are coated with a protective layer of platinum or other platinum group metal where they are in contact with the molten glass or mineral streams, such as the bores of the spinner.

Spinners are frequently cobalt-based and, in addition to cobalt, often contain carbon, chromium, tantalum and zirconium. In addition to these component or constituent materials, some spinner alloys contain hafnium and boron.

Typically, the bores of the spinner are coated with platinum or a platinum-based alloy as the platinum group metal protective layer. Other platinum group metals which may be used are palladium, rhodium, osmium, and iridium.

According to the invention, a substantially uniform layer of barrier material is disposed between the base metal and the protective layer. The barrier material is applied to the surfaces of the bores and serves to prevent diffusion of the base material of the spinner into the protective layer of platinum or other platinum group metal layer.

Useful diffusion barrier materials, according to this invention, comprise materials that form intermetallic compounds with the materials they are in contact with and that are not detrimental to those materials. These materials should also have coefficients of thermal expansion compatible with the spinner material and the protective layer. If they do not, they tend to quickly break or wear away and cause the protective coating to do likewise. Furthermore, they preferably should be capable of being easily applied to the bores of the spinner or easily reacted with the precious metal coating.

For cobalt-based spinners with platinum-based protective coatings, useful barrier materials include zirconium boride ($ZrB_2$), tantalum boride ($TaB_2$), tantalum carbide (TaC), hafnium carbide (HfC), and chromium carbide (CrC). These materials exhibit the qualities of having coefficients of thermal expansion compatible with both the spinner material and the protective layer, although they can be brittle at low temperatures. Such materials form stable barrier layers for the spinner bores and achieve the result of substantially reducing diffusion of the spinner base metal into the platinum group metal coating of the bore.

Other suitable barrier materials within the scope of this invention, for use with cobalt-based spinners having platinum-based protective coatings, include pure metals such as rhenium, iridium, and tungsten.

It is important to note that the barrier layer coating is selected to be compatible with the material of the spinner. While a cobalt-based spinner was discussed above, the spinner may be made of any suitable metal or alloy. For example, spinners are also made using nickel-based materials and some spinners contain little or no carbon; while others contain titanium, tantalum, zirconium, and aluminum. In order for a suitable intermetallic compound to be formed and to function properly, the barrier layer is selected to be compatible with the component or constituent materials of a particular spinner alloy. The general rule is that the base metal contain some of the elements of the barrier coating. If it does not, some of the barrier coating will tend to diffuse into the base metal and reduce the thickness of the barrier layer. Therefore, when using a spinner containing chromium and carbon, a barrier layer of chromium carbide (CrC) should be useful. Whereas a spinner made with a nickel-based alloy and having some titanium but no carbon (Inconel MA758™ for example) would indicate that a barrier layer such as titanium carbide (TiC) may be useful. For a nickel-based spinner containing aluminum alloys, a preferred barrier would be platinum aluminide. In a nickel-based spinner devoid of aluminum alloys, a preferred barrier material would be titanium boride ($TiB_2$). Whatever the barrier layer material, it is selected so as to prevent diffusion of the spinner base material into the bore protective layer. In addition, the selected barrier layer and bore protective layer will have compatible coefficients of thermal expansion.

The diffusion barrier can form as a result of a reaction of the precious metal layer and a reactive alloying element in the spinner base metal. For example, Topor and Kleppa (*Metallurgical Transactions A*, Vol. 18A, November 1987, p. 1989, and Vol. 19A, July 1988, p. 1827) list several very stable precious metal intermetallic compounds—PtTi, PtZr, PtHf, PdTi, PdZr, PdHf, RuTi, RuZr and RuHf—that will form at elevated temperatures when a precious metal is coated onto a superalloy containing a reasonable quantity of one of the reactive metals, e.g., Ti, Hf, or Zr. These intermetallic compounds act as good diffusion barriers when an appropriately thick compound layer is formed, typically 2 to 4 micrometers. The thickness of an appropriately formed intermetallic diffusion barrier is controlled by a heat treatment which is above the operating temperature of the spinner, typically 1121° C. During this heat treatment, an intermetallic compound forms and grows. The growth is also dependent on the concentration of the reactive element in the base metal, typically between 1% and 5% by weight.

Several other reactive elements that can form intermetallic compounds with precious metals are present in some superalloys. Most notably, aluminum is present in sufficient quantities to form platinum aluminide in nickel base ODS alloy, MA956 and MA6000. MA6000 also has tantalum and titanium which could permit the use of a $TiB_2$ or a tantalum carbide diffusion barrier.

Finally, a substantially uniform layer of platinum or other platinum group metal such as palladium or rhodium is applied to the barrier layer. "Platinum" as the term is used here is meant pure platinum and alloys containing platinum; such as, for example platinum/rhodium or platinum/iridium alloys having platinum concentrations from about 70% to about 90% by weight platinum.

Although as a general rule thicker platinum coatings lead to longer spinner life, thick coatings are more expensive. They can require expensive processes if the metal is reclaimed. To be economically viable, thin coatings may not require reclamation if they substantially increase spinner life. With a successful diffusion barrier, platinum coatings as thin as 5 micrometers can significantly increase the corrosion life of spinners.

The method of applying a precious metal alloy coating is limited to those techniques that can result in uniform coatings in small long holes; i.e., holes with a length-to-diameter ratio greater than 3. Typical spinner holes have a length-to-diameter of 7 or greater. Three techniques can meet this requirement. It is believed that chemical vapor deposition (CVD), electroless plating and transient liquid phase (TLP) coating can be successfully employed to coat down long holes.

EXAMPLE 1

An example of a precious metal coating with a diffusion barrier grown from an element in the base metal is commercial alloy MA6000 coated with platinum. MA6000 is a nickel base oxide dispersion strengthened (ODS) alloy typically consisting of 15% chromium, 4% tungsten, 2% molybdenum, 2.5% titanium, 2% tantalum, 0.15% zirconium, 0.05% carbon, 0.1% boron, 4.5% aluminum, 1.1% yttrium oxide with the remainder nickel. A spinner shape can be manufactured from an ODS material utilizing the teachings of U.S. Pat. No. 4,402,767. Conventional hole drilling can be used to form holes. If electro-discharge machining is used instead of twist drilling, laser drilling or electron beam drilling, a hole surface cleaning step should be used to prepare the surface of the holes for later coating steps. One method is to heat clean the surface. This is done by holding the part in vacuum, less than 10 torr, at an elevated temperature, between 980° C. and 1315° C., for at least one hour.

The part can then be coated with platinum using a CVD technique. One such method allows coating at low temperatures. A commercially available precursor gas, such as cyclopenladienylplatinumtrimethel, is added to a closed cold wall chamber along with hydrogen gas. The spinner is heated by inductive heating to 350° C. Thermal decomposition of cyclopenladienylplatinumtrimethel deposits platinum uniformly down the length of holes.

Once the coating is applied, the part is then heat treated in vacuum to grow the platinum aluminide intermetallic diffusion barrier. It is preferred that the heat treatment is done to avoid any premature internal oxidation. The coated part is held at 1200° C. for 2 to 3 hours to develop a diffusion barrier approximately 5 micrometers thick.

EXAMPLE 2

An example of using a deposited material to act as a diffusion barrier for platinum is to first coat a spinner with titanium diboride ($TiB_2$). In this case, a vacuum cast cobalt base superalloy is used to form the spinner shape. A typical composition for the alloy is: 35% chromium, 11% nickel, 6% tungsten, 2.5% tantalum, 0.75% carbon, 0.2% zirconium, and 0.01% boron. After drilling the holes using conventional techniques, the spinner is subjected to a CVD processing step to deposit $TiB_2$. Titanium tetrachloride, $TiCl_4$, diboride hydride, $B_2H_6$, and hydrogen, $H_2$, are introduced into a cold wall chamber. Stoichiometric ratios of $TiCl_4$ and $B_2H_6$ are maintained. The spinner is inductively heated to 600° C. inside the chamber.

Platinum is then coated into the holes using an electroless coating technique. An aqueous solution of 6 grams per liter of platinum IV hydroxide ($Na_2Pt(OH)_6$) is stabilized at a pH of 12.5 with sodium hydroxide, NaOH, and ½ to 1 gram per liter with hydrazine. Preferably, the hydrazine content starts low and small amounts are added as deposition of platinum proceeds. The bath of solution is held between 25° C. and 30° C. with gentle stirring to promote some flow through the holes.

The coated part is then heat treated above the working temperature of the spinner to metallurgically bond the low temperature platinum coating. Holding the part for 2 hours at 1200° C. in a vacuum will avoid oxidation of the barrier coating.

With transient liquid phase deposition, certain alloying elements can substantially reduce the liquidus of platinum. Notable alloying elements include boron and silicon. A preferred alloying element comprises boron, at an atomic ratio of about 40% (approximately 3.55% by weight), which results in a melt temperature of about 830° C.

Transient liquid phase deposition of platinum may be achieved by applying a paste containing platinum and an alloying element to the surface of an article to be coated, and heating the coated article to deposit the platinum. The paste may be prepared by atomizing, for example, a platinum/boron alloy to form small alloy particles (preferably less than about 140 mesh), and mixing the alloy particles with an organic or water-based carrier such as acrylic acid/ethylmethacrylate co-polymer, a mixture of acrylic acid/ethylmethacrylate co-polymer and polyurethane, carboxymethyl cellulose, polyisobutylene, etc.

According to the present invention, the paste is applied to the spinner bores coated with a barrier layer by rotating the spinner to fill the holes and intimately contact the barrier layer. Once the paste has been applied to the spinner bores and dried, the spinner and applied paste is heated to liquefy the alloy powder.

In the case of a 3.55% by weight boron alloy, the spinner and applied paste are heated to a temperature from about 840° centigrade to about 860° centigrade for a period of about one hour. Thereafter the temperature is gradually raised to about 1,000° centigrade over a period of about an additional hour.

It will readily be apparent to one ordinarily skilled in the art that the particular heat treatment used may vary considerably, depending upon the alloying element used, its concentration, the composition of the paste, etc. All heat treatments can be conducted either in a vacuum or in the presence of an inert gas such as argon to avoid oxidation of the boron. The thickness of the resulting platinum layer applied by transient liquid phase deposition which is effective to increase the durability and life of the spinner is from about 10 microns to about 50 microns. Preferably, the thickness of the platinum layer ranges from about 10 microns to about 30 microns.

What is claimed is:

1. A process for preparing a glass fiber spinner, comprising:
    a) providing a spinner comprising a foraminous wall including a plurality of bores having substantially cylindrical surfaces;
    b) applying a substantially uniform layer of a barrier material selected from the group consisting of zirconium boride, tantalum boride, tantalum carbide, hafnium carbide, chromium carbide and titanium diboride on said substantially cylindrical surfaces, said barrier material having a component in common with a component in said spinner; and
    c) applying a substantially uniform layer of a platinum group metal to the layer of barrier material;
    such that the coefficient of thermal expansion of the barrier material is compatible with the metal of the spinner and the platinum group metal.

2. The process of claim 1, wherein the spinner is a cobalt-based alloy comprising, in addition to cobalt, one or more constituents selected from the group consisting of carbon, hafnium, boron, tantalum, zirconium, and chromium.

3. The process of claim 1, wherein the spinner is nickel-based alloy, comprising, in addition to nickel, one or more constituents selected from the group consisting of aluminum, chromium, tantalum, carbon, tungsten, and titanium.

4. The process of claim 1, wherein said barrier layer is applied to the spinner bores by chemical vapor deposition, or electroless deposition.

5. The process of claim 1, wherein said layer of platinum group metal is applied by transient liquid phase deposition.

6. An apparatus for preparing glass fibers, comprising:
    a) a spinner comprising a foraminous wall including a plurality of bores having substantially cylindrical surfaces;
    b) a substantially uniform layer of a barrier material selected from the group consisting of zirconium boride, tantalum boride, tantalum carbide, hafnium carbide, titanium diboride and chromium carbide on said substantially cylindrical surfaces, said barrier material having a component in common with a component in said spinner; and
    c) a substantially uniform layer of a platinum group metal on said barrier layer.

7. The apparatus of claim 6, wherein the spinner is a cobalt-based alloy comprising, in addition to cobalt, one or more constituents selected from the group consisting of carbon, hafnium, boron, tantalum, zirconium, titanium and chromium.

8. The apparatus of claim 6, wherein the spinner is a nickel-based alloy comprising, in addition to nickel, one or more constituents selected from the group consisting of aluminum, chromium, tantalum, carbon, tungsten, and titanium.

* * * * *